United States Patent
Wolf et al.

(10) Patent No.: US 7,695,704 B2
(45) Date of Patent: Apr. 13, 2010

(54) PROCEDURE FOR THE HYDROGENATION OF BNH-CONTAINING COMPOUNDS

(75) Inventors: Gert Wolf, Freiberg (DE); Felix Baitalow, Freiberg (DE); Gerhard Roewer, Freiberg (DE); Steffen Hausdorf, Freiberg (DE); Gerd Arnold, Nauheim (DE); Ulrich Eberle, Mainz (DE); Dieter Hasenauer, Weinheim (DE); Florian O. Mertens, Frankfurt (DE)

(73) Assignees: GM Global Technology Operations, Inc., Detroit, MI (US); Albert Ludwigs Universitat Freiburg, Freiburg (DE)

( * ) Notice: Subject to any disclaimer, the term of this patent is extended or adjusted under 35 U.S.C. 154(b) by 508 days.

(21) Appl. No.: 11/674,186

(22) Filed: Feb. 13, 2007

(65) Prior Publication Data

US 2008/0193356 A1    Aug. 14, 2008

(51) Int. Cl.
| | |
|---|---|
| C01B 35/00 | (2006.01) |
| C01B 35/14 | (2006.01) |
| C01B 21/064 | (2006.01) |
| C01B 3/02 | (2006.01) |
| B01D 59/26 | (2006.01) |
| C01B 17/66 | (2006.01) |
| C01B 6/13 | (2006.01) |
| B01J 20/00 | (2006.01) |

(52) U.S. Cl. .................. 423/285; 423/276; 423/290; 423/648.1; 423/265; 423/284; 423/286; 96/108; 96/147; 96/148; 96/151; 502/526; 502/400

(58) Field of Classification Search .................. None
See application file for complete search history.

(56) References Cited

U.S. PATENT DOCUMENTS

| | | | |
|---|---|---|---|
| 3,024,091 A | 3/1962 | Dean et al. | |
| 3,165,381 A | 1/1965 | Jenkner | |
| 4,957,727 A | 9/1990 | Bogdanovie | |
| 5,763,113 A | 6/1998 | Meltser et al. | |
| 2007/0039474 A1* | 2/2007 | Narula et al. | 96/108 |

FOREIGN PATENT DOCUMENTS

| | | |
|---|---|---|
| DE | 1095797 | 12/1960 |
| DE | 1142589 | 1/1963 |
| DE | 2804445 | 8/1979 |
| DE | 102 43 163 B4 | 9/2006 |
| GB | G 861760 | 2/1961 |

* cited by examiner

*Primary Examiner*—Melvin C Mayes
*Assistant Examiner*—Guinever S Gregorio
(74) *Attorney, Agent, or Firm*—John A. Miller; Miller IP Group, PLC

(57) ABSTRACT

A process for producing borazane from boron-nitrogen and boron-nitrogen-hydrogen containing BNH-waste products. The process includes reacting the BNH-waste products with a hydrogen halide, having the formula HX, wherein X is selected from the group consisting of F, Cl, Br, I, and combinations thereof, to form any of the following: a boron trihalide, having the formula $BX_3$, an ammonium halide, having the formula $NH_4X$, and hydrogen. The boron trihalide is then reacted with the hydrogen to form diborane, having the formula $B_2H_6$, and hydrogen halide. The ammonium halide is then converted to ammonia, having the formula $NH_3$, and hydrogen halide. The diborane is then reacted with the ammonia to form borazane, having the formula $BH_3NH_3$.

52 Claims, 3 Drawing Sheets

PROCEDURE FOR THE HYDROGENATION OF BNH-CONTAINING COMPOUNDS

FIELD OF THE INVENTION

The present invention relates generally to hydrogen storage technology, and more specifically to processes for the rehydrogenation of BNH-containing waste products.

BACKGROUND OF THE INVENTION

The storage of hydrogen is a necessary prerequisite for the introduction of hydrogen-propelled vehicles. Current storage technologies, e.g., Compresses Gaseous Hydrogen ("CGH2") or Liquid Hydrogen ("LH2") pose a severe limitation on the driving range of such automobiles.

Solid state storage systems (e.g., classical or complex metal hydrides, e.g., $FeTi_2$, $NaAlH_4$ and/or the like) might be a viable alternative but will face severe heat management challenges for fundamental thermodynamic reasons. In terms of storage capacity, those compounds usually reveal a lower performance than adequate chemical hydrides (e.g., methanol, borazane, and/or the like).

The use of chemical hydrides requires a hydrogen-release and a subsequent recycling strategy of waste products. Hydrogen can be liberated from borazane (i.e., $BH_3NH_3$) by thermal decomposition, which produces a solid hydrogen-nitrogen residue hereinafter called BNH-waste.

Applicability of borazane as fuel for hydrogen-propelled vehicles is dependent on the availability of borazane in industrial scale quantities. To date, the most common synthesis routes of borazane start either directly from ammonia and diborane or from complex borohydrides, such as $NaBH_4$, and ammonium salts. Generation of borohydride and ammonia related products are energy costly procedures. Because the residue of the dehydrogenated borazane contains the valuable materials boron and nitrogen, it would be advantageous to recycle (re-hydrogenate) the BNH-waste back to borazane. Unfortunately, a system for the re-hydrogenation of BNH-waste does not currently exist.

Accordingly, there exists a need for simple and efficient processes for the re-hydrogenation of BNH-containing waste products.

SUMMARY OF THE INVENTION

In accordance with one aspect of the present invention, there is provided a system for producing borazane from the BNH-waste in which the processes involved are industrially favorable.

In accordance with another aspect of the present invention, there is provided a system for producing borazane from the BNH-waste, which is characterized by improved energy efficiency in comparison with the common synthesis routes.

It accordance with still another aspect of the present invention, there is provided a system for the re-hydrogenation of BNH-waste to borazane that avoids the unwanted accumulation of byproducts.

In accordance with a first embodiment of the present invention, there is provided a process for producing borazane from boron-nitrogen and boron-nitrogen-hydrogen containing BNH-waste products, comprising: a) reacting the BNH-waste products with a hydrogen halide, having the formula HX, to form any of the following: a boron trihalide, having the formula $BX_3$, an ammonium halide, having the formula $NH_4X$, and hydrogen; b) reacting the boron trihalide with hydrogen to form diborane, having the formula $B_2H_6$, and hydrogen halide; c) converting the ammonium halide to ammonia, having the formula $NH_3$, and hydrogen halide; and d) reacting the diborane with ammonia to form borazane, having the formula $BH_3NH_3$, wherein H is hydrogen, wherein B is boron, wherein N is nitrogen, and wherein X is selected from the group consisting of F, Cl, Br, I, and combinations thereof.

In accordance with a first alternative embodiment of the present invention, there is provided a process for producing borazane from boron-nitrogen and boron-nitrogen-hydrogen containing BNH waste products, comprising: a) reacting the BNH-waste products with a hydrogen halide, having the formula HX, to form a boron trihalide, having the formula $BX_3$, and ammonium halide, having the formula $NH_4X$; b) reacting the boron trihalide with a hydride-donating silicon compound, to form diborane $B_2H_6$, and a silicon-containing by-product; c) converting the ammonium halide to ammonia, having the formula $NH_3$, and hydrogen halide; d) reacting the diborane with ammonia to form borazane, having the formula $BH_3NH_3$; and e) reacting the by-product of step (b) with hydrogen to form hydrogen halide and a hydride-donating silicon compound, wherein H is hydrogen, wherein B is boron, wherein N is nitrogen, wherein X is selected from the group consisting of F, Cl, Br, I, and combinations thereof.

In accordance with a second alternative embodiment of the present invention, there is provided a process for producing borazane from boron-nitrogen and boron-nitrogen-hydrogen containing BNH waste products, comprising: a) reacting the BNH-waste products with a hydrogen halide, having the formula HX, to form a boron trihalide, having the formula $BX_3$, and ammonium halide, having the formula $NH_4X$; b) reacting the boron trihalide with a metal hydride to form diborane $B_2H_6$ and a metal-containing by-product; c) converting the ammonium halide to ammonia, having the formula $NH_3$, and hydrogen halide; d) reacting the diborane with ammonia to form borazane, having the formula $BH_3NH_3$; and e) reacting the by-product of step (b) with hydrogen to form hydrogen halide and a metal hydride, wherein H is hydrogen, wherein B is boron, wherein N is nitrogen, wherein M is a metal, and wherein X is selected from the group consisting of F, Cl, Br, I, and combinations thereof.

In accordance with one aspect of the present invention, the BNH-waste product of step (a) is converted to gaseous boron trihalide and solid ammonium halide by reacting the BNH-waste product with gaseous hydrogen halide.

In accordance with one aspect of the present invention, the BNH-waste product is converted to ammonium halide and a partially hydrogenated boron compound having the formula $BH_yX_{3-y}$, wherein y is equal to 1 or 2.

In accordance with one aspect of the present invention, the BNH-waste product of step (a) is converted to boron trihalide and ammonium halide by reacting hydrogen halide with a slurry of BNH-waste product in an organic solvent selected from the group consisting of glyme, diglyme, triglyme, substituted 2,2,5,5-tetrahydrofuranes of formula $(CR_2CH_2CH_2CR_2)O$, wherein R is independently selected from hydrogen and straight or branched $C_1$ to $C_4$ alkyl group, ethers of the formula ROR, wherein R is independently selected from straight or branched $C_1$ to $C_4$ alkyl groups, unsubstituted or substituted phenyl groups, and combinations thereof.

In accordance with one aspect of the present invention, the slurry of BNH-waste product is converted into ammonium halide and a complex of the boron trihalide with a solvent molecule.

In accordance with one aspect of the present invention, the slurry of BNH-waste product is converted into ammonium halide and a partially hydrogenated boron compound having the formula $BH_yX_{3-y}$, wherein y is 1 or 2, or a dissolved complex of a boron compound having the formula $BH_yX_{3-y}$, wherein y is 1 or 2, with a solvent molecule.

In accordance with one aspect of the present invention, the boron trihalide of step (b) is hydrogenated in solution in the presence of a base.

In accordance with one aspect of the present invention, the base is selected from the group consisting of compounds having the formula $NR_3$, wherein R is independently selected from hydrogen, straight or branched $C_1$ to $C_6$ alkyl groups, unsubstituted or substituted phenyl groups, and combinations thereof.

In accordance with one aspect of the present invention, the base is comprised of nitrogen-containing heterocyclic compounds.

In accordance with one aspect of the present invention, the hydrogenation of boron trihalide is in the presence of a base and forms a dissolved $BH_3$-base complex, wherein the base is selected from the group consisting of heterocyclic compounds, compounds having the formula $NR_3$, wherein R is independently selected from hydrogen, straight or branched $C_1$ to $C_6$ alkyl groups, unsubstituted or substituted phenyl groups, and combinations thereof.

In accordance with one aspect of the present invention, the hydrogenation of boron trihalide is in the presence of a base and forms a solid by-product base-hydrogen halide.

In accordance with one aspect of the present invention, the hydrogenation of boron trihalide is performed in the presence of a homogeneous hydrogenation catalyst.

In accordance with one aspect of the present invention, the solvent is a base selected from the group consisting of heterocyclic compounds, compounds having the formula $NR_3$, wherein R is independently selected from hydrogen, straight or branched $C_1$ to $C_6$ alkyl groups, unsubstituted or substituted phenyl groups, and combinations thereof.

In accordance with one aspect of the present invention, the solvent is a complex having the formula $BH_3NR_3$.

In accordance with one aspect of the present invention, the diborane is removed from a reaction mixture that contains the dissolved $BH_3$-base complex by reacting with fresh boron trichloride.

In accordance with one aspect of the present invention, the solid by-product base-hydrogen halide is recycled to the base and hydrogen halide for use in step (b) and step (a), respectively.

In accordance with one aspect of the present invention, the production of ammonia in step (c) is promoted by reacting of a slurry of ammonium halide with a base, wherein the base is selected from the group consisting of heterocyclic compounds, compounds having the formula $NR_3$, wherein R is independently selected from hydrogen, straight or branched $C_1$ to $C_6$ alkyl groups, unsubstituted or substituted phenyl groups, and combinations thereof.

In accordance with one aspect of the present invention, the reaction of the ammonium halide with a base leads to the formation of a by-product base-hydrogen halide.

In accordance with one aspect of the present invention, the by-product base-hydrogen halide is recycled to the base and hydrogen halide for use in step (b) and step (a), respectively.

In accordance with one aspect of the present invention, step (d) is performed by reacting frozen liquid ammonia and gaseous diborane.

In accordance with one aspect of the present invention, step (d) is performed in an organic solvent.

In accordance with one aspect of the present invention, step (d) is performed in an organic solvent selected from the group consisting of glyme, diglyme, triglyme, substituted 2,2,5,5-tetrahydrofuranes having the formula $(CR_2CH_2CH_2CR_2)O$, wherein R is independently selected from hydrogen and straight or branched $C_1$ to $C_4$ alkyl group, ethers of the formula ROR, wherein R is independently selected from straight or branched $C_1$ to $C_4$ alkyl groups, unsubstituted or substituted phenyl groups, and combinations thereof.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE INVENTION

Figure 1:
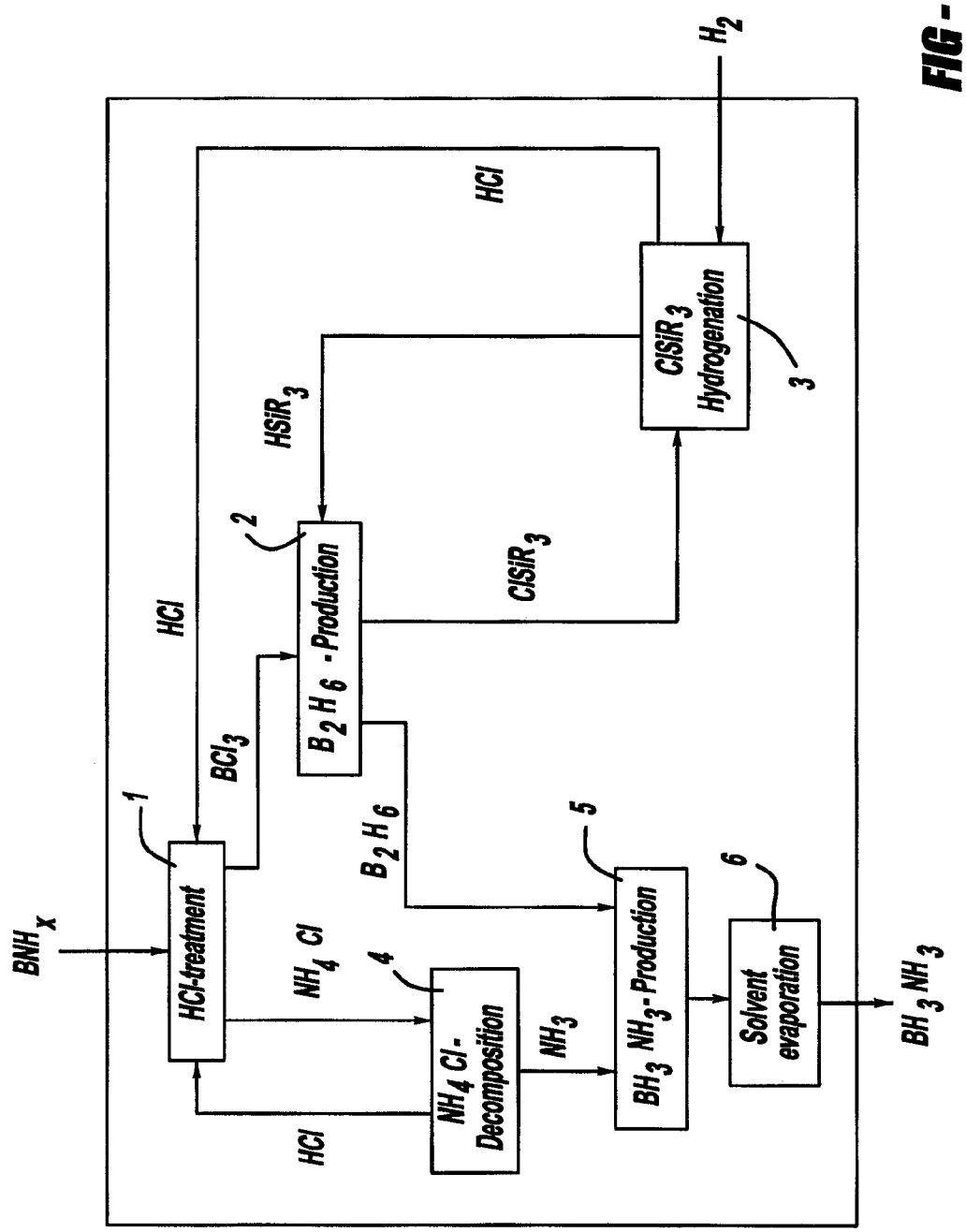
FIG. 1 illustrates a flow diagram for a first scheme (i.e., scheme 1) utilizing HCl as a proton-donating auxiliary reagent and $HSiR_3$ as a hydride-donating auxiliary reagent, the BNH-waste being schematically depicted as $BNH_x$, in accordance with a first embodiment of the present invention.

The following description of the preferred embodiment(s) is merely exemplary in nature and is in no way intended to limit the invention, its application, or uses.

The solid compound borazane (i.e., $BH_3NH_3$) releases hydrogen under technically favorable conditions (e.g., at ambient pressure and temperatures around 100° C.). The release of hydrogen can be performed from solid borazane or from borazane in solution. Similar behavior is also typical for different other boron/nitrogen/hydrogen-containing compounds. Such BNH-compounds are referred to herein as chemical BNH-hydrides. Dehydrogenation of chemical BNH-hydrides produces different kinds of BNH-products, such as ones with polymeric structures and the fully dehydrogenated amorphous boron nitride BN. These BNH-products, e.g., boron nitride (i.e., BN), are designated as BNH-waste.

The dehydrogenation of solid borazane involves $H_2$-release, typically at temperatures ranging from about 70° C. to about 800° C., and in accordance with one aspect of the present invention, from about 80° C. to about 180° C. The dehydrogenated products predominantly include polymeric structures, e.g., $(BH_2NH_2)_x$, $(BHNH)_x$, and/or the like. The formation of other products, e.g., the fully dehydrogenated boron nitride BN, depends on the applied conditions.

The dehydrogenation of borazane in solution also involves $H_2$-release, typically at temperatures ranging from about 25° C. to about 300° C., and in accordance with one aspect of the present invention from about 50° C. to about 130° C., depending on solvent and catalyst.

The dehydrogenated products include a mixture of products with different structures.

The hydrogenation of dehydrogenated BNH-products with molecular hydrogen previously seemed to be possible only at very high hydrogen pressures due to thermodynamic limitations. The thermodynamic barrier for the hydrogenation of polymeric dehydrogenated BNH-products was estimated to be about $\Delta_R G = 60$ kJ $mol^{-1}$ (per mol $H_2$).

The present invention provides a system for the chemical re-hydrogenation of all kinds of BNH-waste, particularly those obtained after the dehydrogenation of solid borazane or borazane in solution. The present invention provides three different rehydrogenation schemes (e.g., designated as scheme 1, scheme 2, and scheme 3, respectively).

In the first two cases, the BNH-waste is converted to borazane by reacting with auxiliary reagents, which contain protic hydrogen, e.g., hydrogen halide, and hydridic hydrogen (e.g., silanes (e.g., scheme 1) or metal hydrides (e.g., scheme 2)). The conversion proceeds through the formation of ammonia and diborane. After re-hydrogenation of the BNH-waste, the obtained by-product should be recharged with molecular hydrogen.

In the third case (e.g., scheme 3), the BNH-waste is treated only with an auxiliary reagent, which contains protic hydrogen (e.g., a hydrogen halide). The obtained boron trihalide is then directly hydrogenated with molecular hydrogen to diborane and afterwards converted with ammonia to borazane.

Accordingly, the present invention provides a system for the recycling of the BNH-waste, which allows an energy efficient production of borazane on an industrial scale.

For establishing in recycling schemes 1 and 2 a closed hydrogenation cycle, one needs to recharge the byproducts obtained after the BNH-waste hydrogenation (e.g., chlorinated silanes, metal chlorides, and/or the like) with molecular hydrogen to regenerate the hydrogen-containing auxiliary reagents. Thus, the $H_2$-recharging step (which is the limiting step of the recycling system) is shifted from the hydrogenation of BNH-waste to the hydrogenation of by-products. The $H_2$-recharging of by-products should be achievable at technically favorable conditions.

The present invention is particularly concerned with the re-hydrogenation of the BNH-waste obtained after the dehydrogenation of solid borazane or borazane in solution. The proposed system is further applicable to the hydrogenation of BNH-waste obtained from other sources beside borazane.

Depending on the conditions of the borazane dehydrogenation, the obtained residue of this reaction may be a solidified powder or foam, viscous slurry or solution. The chemical composition of the obtained residue, designated in the present invention as BNH-waste, is also strongly influenced by the processing of the borazane dehydrogenation. Whatever the form, chemical composition, and origin of the BNH-waste, the initial step in the recycling scheme is the treatment of the BNH-waste with a proton-donating auxiliary reagent. Examples of the proton-donating auxiliary reagents to be used include, but are not limited to, hydrogen halides (HX) with X being F, Cl, Br and/or I. Hydrogen chloride (HCl) and hydrogen bromide (HBr) are especially useful in the practice of the present invention. In the following, HCl is exemplarily used as a proton-donating auxiliary reagent for the re-hydrogenation procedure of the BNH-waste.

All of the schemes of the present invention involve as the initial step the treatment of the BNH-waste with a proton-donating auxiliary reagent. One example is illustrated in FIG. 1 which utilizes HCl as a proton-donating auxiliary reagent. The treatment of the BNH-waste (which is schematically depicted as $BNH_x$) with HCl produces a boron-containing compound, i.e., boron trichloride $BCl_3$, a nitrogen-containing compound, i.e., ammonium chloride $NH_4Cl$, and hydrogen, as shown by the following equation (1):

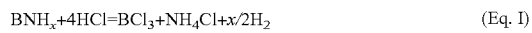

$$BNH_x + 4HCl = BCl_3 + NH_4Cl + x/2 H_2 \qquad (Eq. I)$$

Thus, the BNH-waste is fully transformed into the simple, well defined compounds $BCl_3$ and $NH_4Cl$. The release of hydrogen is caused by the reaction of HCl with the hydridic hydrogen bonded to the boron atom in the BNH-waste. The hydrogen released in this way can be readily used elsewhere in the overall re-hydrogenation scheme. It is an advantage of the proposed re-hydrogenation procedure that the performance of the reaction of the BNH-waste with HCl does not depend on the chemical composition and origin of the BNH-waste.

It is an object of the present invention that the transformation of the BNH-waste into $BCl_3$ and $NH_4Cl$ can be practically realized through the following processes:

The BNH-waste can be treated with gaseous or liquid proton-donating auxiliary reagent. In the following, the overall re-hydrogenation procedure is discussed exemplary for the use of HCl as proton-donating reagent. The BNH-waste reacts with gaseous HCl in the temperature range from about 100° C. to about 300° C., and in accordance with one aspect of the present invention between 120° C. and 180° C. (e.g., see process 1 in FIG. 1).

The reaction can be performed in a pure HCl atmosphere, but the dilution of gaseous HCl with inert gases such as nitrogen or argon, is more favored. Gaseous $BCl_3$ can be separated from the product gas stream using various techniques, but cooling to a temperature range of −20° C. to 0° C. is the favored method. Subsequently, the gas stream could be re-inserted into the reactor for BNH-waste treatment to ensure total conversion of all HCl. The solid residue after the treatment of the BNH-waste with HCl consists of $NH_4Cl$, which needs to be removed from the reactor for its further processing.

Alternatively, the BNH-waste can be treated with a proton-containing auxiliary reagent in solution (not shown in FIG. 1). In accordance with one aspect of the present invention, donor solvents are more favored. The slurry of the BNH-waste in donor solvents reacts with HCl at significantly lower temperatures compared to the treatment of the BNH-waste with gaseous HCl. The reaction temperature is lowered due to an easier cleavage of the B—N bonds in the BNH-waste under influence of donor solvents. Examples of solvents to be used include, but are not limited to, diglyme or 2,5-dimethyltetrahydrofurane. These solvents are characterized by sufficiently high donor strength and great chemical stability, in contrast to tetrahydrofurane, which is actually a stronger donor but undergoes a ring cleavage reaction under the influence of boron-containing compounds, like $BCl_3$. For example, the reaction of BNH-waste with HCl in diglyme can be performed at temperatures from about 25° C. to about 80° C. Such treatment of the BNH-waste with HCl produces a dissolved $BCl_3$* solvent complex, which can be separated from the solid $NH_4Cl$ by filtration.

After the treatment of the BNH-waste with a proton-donating auxiliary reagent and the separation step, the boron-containing products and the nitrogen-containing products undergo the next reaction steps separately. The boron-containing product, i.e., $BCl_3$ or a $BCl_3$-solvent complex, is converted to diborane ($B_2H_6$) or a $BH_3$-solvent complex. The nitrogen-containing product, i.e., $NH_4Cl$, is converted to ammonia ($NH_3$). Finally, the direct reaction of $B_2H_6$ with $NH_3$ leads to the production of borazane ($BH_3NH_3$), as shown in FIG. 1. This general procedure is the same for all three proposed reaction schemes.

The conversion of $BCl_3$ to $B_2H_6$ is possible via various reaction sequences. According to schemes 1 and 2, $BCl_3$ reacts with hydride-donating auxiliary reagents. By "hydride-donating," as that phrase is used herein it is meant any source of hydride ions (H⁻). This reaction leads to the production of $B_2H_6$ and formation of a by-product. This by-product should be recharged in a second step with molecular hydrogen in order to recover the initial proton-donating and hydride-donating auxiliary reagents. The $H_2$-recharging step is required in order to establish a closed cycle for the re-hydrogenation of the BNH-waste.

Several types of hydride-donating auxiliary reagents react with $BCl_3$ to produce $B_2H_6$. Among others, silicon-containing substances can be used (e.g., scheme 1). Examples of the auxiliary reagents to be used include, but are not limited to, compounds with the general formula $HSiR_3$, where R substituents can be hydrogen, halide (e.g., Cl or Br), linear or branched $C_1$ to $C_6$ alkyl groups, unsubstituted or substituted phenyl groups, linear or branched $C_1$ to $C_4$ alkoxy groups (all R substituents can be the same, but do not necessarily have to be). Furthermore, cyclic compounds, such as but not limited to siloxanes, can also be used. Suitable reagents include, but are not limited to $HSiCl_3$, $HSiEt_3$ and/or $HSiBu_3$ (e.g., see process 2 in FIG. 1). An example of a reaction between $BCl_3$ and one of the afore-mentioned hydride-donating auxiliary reagents is shown in the equation (II), below:

$$BCl_3 + 3HSiR_3 = \tfrac{1}{2}B_2H_6 + 3ClSiR_3 \qquad \text{(Eq. II)}$$

According to patent application DE 1142589, the gas-phase reaction between $BCl_3$ and $SiH_4$ proceeds already at ambient temperature. The obtained by-product $SiCl_4$ was separated from $B_2H_6$ by dissolution in triethylsilane ($HSiEt_3$).

The use of liquid silanes simplifies the separation of gaseous $B_2H_6$, especially if the chlorinated silicon-containing by-product is a liquid too. According to patent application DE 1095797, gaseous $BCl_3$ reacts with liquid $HSiEt_3$, $H_2SiEt_2$ or $H_2SiPh_2$ in the temperature range from about 25° C. to about 80° C. The $B_2H_6$ obtained can be easily separated from other reaction products, because it is the only product that is gaseous.

In accordance with one aspect of the present invention, the reaction of $BCl_3$ with silanes could be also performed in solution (not shown in FIG. 1). The production of $B_2H_6$ proceeds at temperatures about 25° C. If the initial treatment of the BNH-waste with HCl was performed in solution, it is favored to perform the subsequent conversion of $BCl_3$ to $B_2H_6$ in the same solvent. The conversion in donor solvents produces a dissolved $BH_3^*$ solvent complex. Consequently, the final reaction with $NH_3$ to produce borazane $BH_3NH_3$ should then be performed with such a $BH_3^*$ solvent complex directly.

The by-product obtained during the conversion of $BCl_3$ to $B_2H_6$ should be recharged with molecular hydrogen according to the following equation (III) (e.g., see process 3 in FIG. 1), below:

$$ClSiR_3 + H_2 = HSiR_3 + HCl \qquad \text{(Eq. III)}$$

For example, the recycling of $SiCl_4$ to $HSiCl_3$ is a well-known technical process, widely applied in the semiconductor industry. The reaction of $SiCl_4$ with $H_2$ proceeds in the temperature range of about 800° C. to about 900° C. using metal catalysts such as nickel or iron.

A variation of the described procedure involves the one-way use of silicon-containing substances, which are waste materials obtained from the semiconductor industry. These materials are roughly described by the formula Alk[-OSi(H)(Alk)-]$_n$OAlk, wherein n=3-50.

Figure 2:
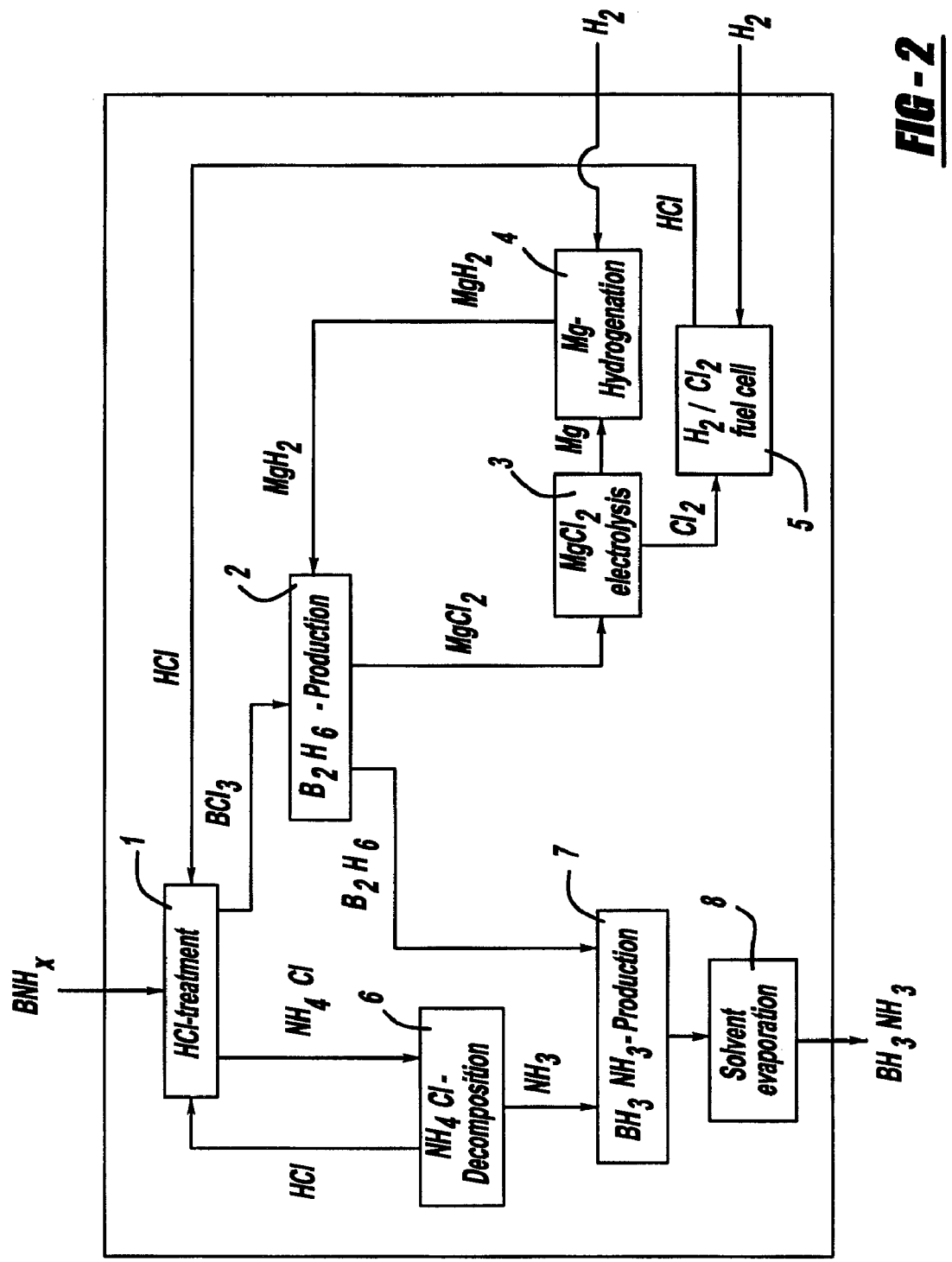
FIG. 2 illustrates a flow diagram for a second scheme (i.e., scheme 2) utilizing HCl as a proton-donating auxiliary reagent and $MgH_2$ as a hydride-donating auxiliary reagent, in accordance with a first alternative embodiment of the present invention.

Other hydride-donating auxiliary reagents, which react with $BCl_3$ to produce $B_2H_6$, are metal hydrides (e.g., scheme 2). Examples include, but are not limited to, NaH, $MgH_2$, $CaH_2$, $ZnH_2$. One example is illustrated in FIG. 2 utilizing $MgH_2$ as hydride-donating auxiliary reagent. The reaction of $BCl_3$ with $MgH_2$ proceeds as follows (e.g., see process 2 in FIG. 2) in the equation (IV), below:

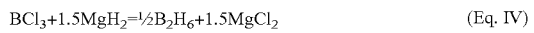
$$BCl_3 + 1.5MgH_2 = \tfrac{1}{2}B_2H_6 + 1.5MgCl_2 \qquad \text{(Eq. IV)}$$

According to U.S. Pat. No. 3,024,091, the conversion of $BCl_3$ to $B_2H_6$ can be performed in a ball mill by reacting $BCl_3$ with $MgH_2$ in the presence of $AlCl_3$ in an aliphatic or aromatic hydrocarbon solvent at ambient temperatures.

In accordance with an aspect of the present invention, suspensions of active $MgH_2$ react with $BCl_3$ to produce $B_2H_6$. According to the patent application DE2804445, active $MgH_2$ could be prepared by the hydrogenation of magnesium powder in THF solution in the presence of anthracene and a Ti-catalyst (e.g., see process 4 in FIG. 2). The active $MgH_2$ reacts exothermally with $BCl_3$ while forming $B_2H_6$ (e.g., see process 2 in FIG. 2). The solid by-product magnesium chloride $MgCl_2$ can be separated from the reaction mixture by filtration. If the initial treatment of the BNH-waste with HCl was performed in solution, it is highly favored to perform the subsequent conversion of $BCl_3$ to $B_2H_6$ in the same solvent. As in the case of silanes, conversions in donor solvents produce $BH_3^*$ solvent complexes, which can be used for the production of borazane $BH_3NH_3$ by direct reaction with $NH_3$.

According to a well known electrochemical procedure the by-product $MgCl_2$ can be converted to elemental magnesium and chlorine in electrochemical cells (e.g. see process 3 in FIG. 2) according to the equation (V), below:

$$MgCl_2 = Mg + Cl_2 \qquad \text{(Eq. V)}$$

Subsequently, chlorine needs to being reacted with hydrogen (e.g., see process 5 in FIG. 2) according to the equation (VI), below:

$$Cl_2 + H_2 = 2HCl \qquad \text{(Eq. VI)}$$

Some energy could be retrieved by generating electricity from this process via a chlorine-hydrogen electrochemical cell. This energy could be used for the electrolysis of the $MgCl_2$.

The preparation of $B_2H_6$ by the reaction of $BCl_3$ with hydride-donating auxiliary reagents (e.g., schemes 1 and 2) and the subsequent recharging of the obtained by-products with molecular hydrogen is less efficient than the highly favored route, i.e., the direct synthesis of $B_2H_6$ by the reaction of $BCl_3$ with $H_2$ (e.g., scheme 3) according to the equation (VII), below:

$$BCl_3 + 3H_2 = \tfrac{1}{2}B_2H_6 + 3HCl \qquad \text{(Eq. VII)}$$

The only by-product is HCl which can be readily used somewhere in the recycling procedure. The direct hydrogenation of $BCl_3$ with $H_2$ to produce $B_2H_6$ is the key step of scheme 3.

Due to the existing equilibrium, the reaction of $BCl_3$ with $H_2$ can be performed with quantitative yields at higher temperatures only. According to a procedure described in the patent GB 866522, $BCl_3$ can be hydrogenated in the gas phase at temperatures in the range from 600 to 750° C. The reaction mixture that contains the intermediate compound $BHCl_2$ and the by-product HCl should be rapidly cooled to a temperature of −196° C. After that, $BHCl_2$ dispropotionates to diborane and boron trichloride, which are subsequently separated.

Alternatively, the reaction of $BCl_3$ with $H_2$ can be driven to completion by removing HCl from the reaction mixture, for example by the binding of HCl with bases. According to a procedure described in the patent application GB 861760, $BCl_3NEt_3$ can be hydrogenated with molecular hydrogen in presence of the base $NEt_3$. The reaction proceeds at temperatures in the range from 180° C. to 200° C. and hydrogen pressures from 100 to 1000 atmospheres, according to the equation (VIII), below:

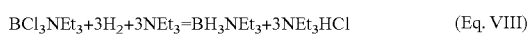
$$BCl_3NEt_3 + 3H_2 + 3NEt_3 = BH_3NEt_3 + 3NEt_3HCl \qquad \text{(Eq. VIII)}$$

Figure 3:
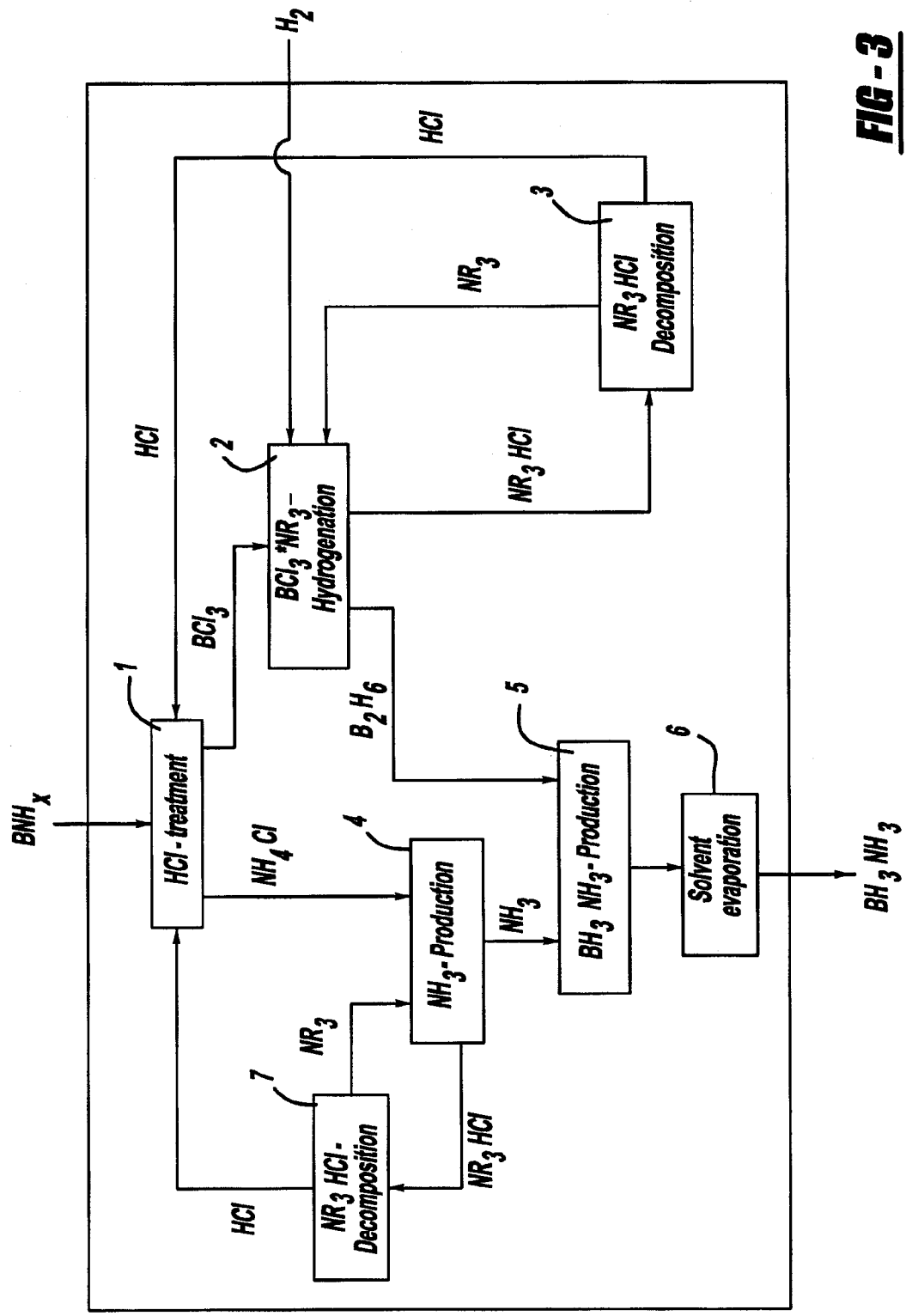
FIG. 3 illustrates a flow diagram for a third scheme (i.e., scheme 3) utilizing HCl as a proton-donating auxiliary reagent and $NR_3$ as an auxiliary base, in accordance with a second alternative embodiment of the present invention.

In accordance with an aspect of the present invention, a related process can be executed at significantly milder conditions. A possible example is illustrated in FIG. 3 utilizing HCl as a proton-donating auxiliary reagent and $NR_3$ as an auxiliary base. The reaction proceeds as follows (e.g., see process 2 in FIG. 3) in the following equation (IX), below:

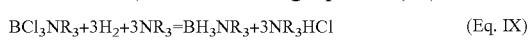
$$BCl_3NR_3 + 3H_2 + 3NR_3 = BH_3NR_3 + 3NR_3HCl \qquad \text{(Eq. IX)}$$

Examples of auxiliary bases to be used include, but are not limited to, nitrogen bases $NR_3$, where R substituents could be hydrogen, linear or branched $C_1$ to $C_6$ alkyl groups, unsubstituted or substituted phenyl groups (R substituents can be the same or different). Additionally, the application of nitrogen-containing heterocycles is possible. HCl can be removed from the reaction mixture by precipitation of the HCl* base complex, i.e. ammonium chloride with the general formula $NR_3HCl$. The solid precipitate can be easily separated from the liquid phase by filtration. After the separation step, HCl can be recovered by thermal decomposition of the $NR_3HCl$ as described below. Well-suitable bases are triethylamine $NEt_3$ and triphenylamine $NPh_3$. Comparably mild reaction conditions should be achievable due to the application of homogeneous metal catalysts. Examples of metal complexes to be used include, but are not limited to, Pt, Rh, Pd, Mo, W, Mn based complexes with different ligands, such as Cl, CO, $PPh_3$, cyclopentadienyl and/or the like. If the initial treatment of the BNH-waste with HCl was performed in solution, it is highly favored to perform the subsequent conversion of $BCl_3$ to $B_2H_6$ in the same solvent.

There are different methods for the extraction of the target product $B_2H_6$ from the obtained complex $BH_3NR_3$. A highly favored method for this extraction process is the reaction of the produced $BH_3NR_3$ with freshly provided $BCl_3$, which proceeds according to the following reaction equation (X):

$$BH_3NR_3 + BCl_3 = BCl_3NR_3 + \tfrac{1}{2}B_2H_6 \tag{Eq. X}$$

The overall reaction equation of the last two equations is given by the equation (XI), below:

$$BCl_3 + 3H_2 + 3NR_3 = \tfrac{1}{2}B_2H_6 + 3NR_3HCl \tag{Eq. XI}$$

The initial process of all three schemes includes the production of $BCl_3$ and $NH_4Cl$ from BNH-waste. The nitrogen-containing product, $NH_4Cl$, should be converted to $NH_3$ and HCl. At least three (a-c) reaction sequences to produce $NH_3$ from $NH_4Cl$ can be used.

a) According to a well-known process, $NH_4Cl$ decomposes at temperatures above 300° C. under release of gaseous $NH_3$ and HCl (e.g., see process 4 in FIG. 1 and process 6 in FIG. 2) according to the equation (XII), below:

$$NH_4Cl = NH_3 + HCl \tag{Eq. XII}$$

The thermal decomposition of $NH_4Cl$ is strongly endothermic. An energetic coupling of this endothermic step with any exothermic reaction step in the proposed re-hydrogenation procedure by means of heat exchangers is highly favored in order to improve the energy efficiency.

A severe practical problem is the separation of $NH_3$ and HCl in the gas phase resulting from the $NH_4Cl$ decomposition. To solve this problem, the use of non-volatile proton-donating auxiliary reagents (e.g., liquid or solid) instead of the gaseous HCl is recommended, because then the gaseous $NH_3$ can be easily separated.

b) Another well-known technical process allows the production of $NH_3$ from $NH_4Cl$ using $Mg(OH)_2$ (not shown in figures), according to equations (XIII and XIV, respectively), below:

$$2NH_4Cl + Mg(OH)_2 + 4H_2O = 2NH_3 + MgCl_2 \cdot 6H_2O \tag{Eq. XIII}$$

$$MgCl_2 \cdot 6H_2O = Mg(OH)_2 + 2HCl + 4H_2O \tag{Eq. XIV}$$

The thermal decomposition of $MgCl_2 \cdot 6H_2O$ proceeds at temperatures above 250° C. and is strongly endothermic. An energetic coupling with exothermic steps is highly favored. In the present method, the separation of $NH_3$ and HCl is not problematic, because the release of gaseous $NH_3$ and HCl proceeds at different reaction steps.

c) A special method for the production of $NH_3$ from $NH_4Cl$ is also conceivable. The slurry of $NH_4Cl$ in an appropriate solvent is stirred with an excess of an auxiliary nitrogen-containing base $NR_3$. The favored solvent is the base itself. The reaction can be driven by removal of gaseous $NH_3$ from the solution (e.g., see process 4 in FIG. 3) according to the equation (XV), below:

$$NH_4Cl + NR_3 = NH_3 + NR_3HCl \tag{Eq. XV}$$

The by-product $NR_3HCl$ should be regenerated to $NR_3$ and HCl as described below (e.g., see also process 3 in FIG. 3).

The nitrogen containing compound $NR_3HCl$, which was produced during the reaction of $BCl_3$ with molecular hydrogen, according to scheme 3, should be recycled to $NR_3$ and HCl. The most favored method is then the thermal decomposition of $NR_3HCl$ (e.g., see processes 3 and 7 in FIG. 3) according to the equation (XVI), below:

$$NR_3HCl = NR_3 + HCl \tag{Eq. XVI}$$

Generally, the thermal decomposition of $NR_3HCl$ is an endothermic process. An energetic coupling with any exothermic steps is highly favored. The separation of the reaction products is facilitated by the use of non-volatile auxiliary nitrogen bases.

The reaction schemes 1-3 described above involve as the final step the direct reaction of $B_2H_6$ with $NH_3$, which leads to the production of borazane $BH_3NH_3$ (e.g., see processes 5, 7, 5 in FIGS. 1, 2, and 3, respectively).

The net equation of all proposed recycling schemes for regenerating borazane from BNH-waste is given by the equation (XVII), below:

$$BNH_x + (3-x/2)H_2 = BH_3NH_3 \tag{Eq. XVII}$$

The main benefit of the proposed procedure is that it only consumes molecular hydrogen. All other reagents are regenerated within the proposed procedure.

The net reaction of the proposed procedure for the re-hydrogenation of the BNH-waste is endothermic. Thermodynamic values for the overall re-hydrogenation process and for the single steps of some variants of the proposed schemes 1-3 are shown below. The required thermodynamic data was taken from handbooks, original papers or were directly measured.

The overall rehydrogenation process is shown in Table I, below:

TABLE I

| Starting Materials | End Product(s) | $\Delta_R H$, kJ $mol^{-1}$ | $\Delta_R G$, kJ $mol^{-1}$ |
|---|---|---|---|
| $BNH_2$ (s) + $2H_2$ (g) → $BH_3NH_3$ (s) | | 40 | 120 |

A variant of scheme 1, illustrated in FIG. 1, is show in Table II, below:

TABLE II

| Starting Materials | End Product(s) | $\Delta_R H$, kJ $mol^{-1}$ | $\Delta_R G$, kJ $mol^{-1}$ | Temp. |
|---|---|---|---|---|
| $BNH_2$ (s) + 4HCl (g) → $BCl_3$ (g) + $NH_4Cl$ (s) + $H_2$ (g) | | −150 | −70 | 150° C. |
| $BCl_3$ (g) + $3HSiCl_3$ (g) → $\tfrac{1}{2}B_2H_6$ (g) + $3SiCl_4$ (g) | | −80 | −40 | 25° C. |
| $3SiCl_4$ (g) + $3H_2$ (g) → $3HSiCl_3$ (g) + 3HCl (g) | | 210 | 100 | 800° C. |

TABLE II-continued

| Starting Materials | End Product(s) | $\Delta_R H$, kJ mol$^{-1}$ | $\Delta_R G$, kJ mol$^{-1}$ | Temp. |
|---|---|---|---|---|
| $NH_4Cl$ (s) | → $NH_3$ (g) + HCl (g) | 160 | 0 | 350° C. |
| ½$B_2H_6$ (g) + $NH_3$ (g) | → $BH_3NH_3$ (s) | −130 | −60 | 25° C. |

A variant of scheme 2, illustrated in FIG. 2, is show in Table III, below:

TABLE III

| Starting Materials | End Products(s) | $\Delta_R H$, kJ mol$^{-1}$ | $\Delta_R G$, kJ mol$^{-1}$ | Temp. |
|---|---|---|---|---|
| $BNH_2$ (s) + 4HCl (g) | → $BCl_3$ (g) + $NH_4Cl$ (s) + $H_2$ (g) | −150 | −70 | 150° C. |
| $BCl_3$ (g) + 3/2$MgH_2$ (s) | → ½$B_2H_6$ (g) + 3/2$MgCl_2$ (s) | −430 | −400 | 25° C. |
| 3/2$MgCl_2$ (s) | → 3/2Mg (s) + 3/2$Cl_2$ (g) | 960 | 730 | 700° C. |
| 3/2Mg (s) + 3/2$H_2$ (g) | → 3/2$MgH_2$ (s) | −110 | −50 | 25° C. |
| 3/2$H_2$ (g) + 3/2$Cl_2$ (g) | → 3HCl (g) | −280 | −290 | 25° C. |
| $NH_4Cl$ (s) | → $NH_3$ (g) + HCl (g) | 160 | 0 | 350° C. |
| ½$B_2H_6$ (g) + $NH_3$ (g) | → $BH_3NH_3$ (s) | −130 | −60 | 25° C. |

A variant of scheme 3, illustrated in FIG. 3 is show in Table IV, below:

TABLE IV

| Starting Materials | End Products(s) | $\Delta_R H$, kJ mol$^{-1}$ | $\Delta_R G$, kJ mol$^{-1}$ | Temp. |
|---|---|---|---|---|
| $BNH_2$ (s) + 4HCl (g) | → $BCl_3$ (g) + $NH_4Cl$ (s) + $H_2$ (g) | −150 | −70 | 150° C. |
| $BCl_3$ (g) + 3$H_2$ (g) + 3$NEt_3$ (l) | → ½$B_2H_6$ (g) + 3$NEt_3HCl$ (s) | −360 | −110 | 25° C. |
| $NH_4Cl$ (s) + $NEt_3$ (l) | → $NH_3$ (g) + $NEt_3HCl$ (s) | 10 | 0 | 25° C. |
| 4$NEt_3HCl$ (s) | → 4$NEt_3$ (g) + 4HCl (g) | 680 | 0 | 400° C. |
| ½$B_2H_6$ (g) + $NH_3$ (g) | → $BH_3NH_3$ (s) | −130 | −60 | 25° C. |

Further, some hydride-donating auxiliary reagents, which could be used according to different schemes of the present invention, are compared regarding thermodynamic values for the key step, i.e., the conversion of $BCl_3$ to $B_2H_6$. The thermodynamic values for the hydrogenation of the corresponding by-products are calculated also. Obtained values are shown in Tables V and VI, respectively, below:

TABLE V

Conversion of $BCl_3$ to $B_2H_6$ (all calculations at 25° C.)

| Starting Materials | End Products(s) | $\Delta_R H$, kJ mol$^{-1}$ | $\Delta_R G$, kJ mol$^{-1}$ |
|---|---|---|---|
| $BCl_3$ (g) + 3$HSiCl_3$ (l) | → ½$B_2H_6$ (g) + 3$SiCl_4$ (l) | −80 | −40 |
| $BCl_3$ (g) + 3$HSiEt_3$ (l) | → ½$B_2H_6$ (g) + 3$ClSiEt_3$ (l) | −100 | −70 |
| $BCl_3$ (g) + 3/2$H_2SiCl_2$ (g) | → ½$B_2H_6$ (g) + 3/2$SiCl_4$ (l) | −90 | −60 |
| $BCl_3$ (g) + 3/2$H_2SiEt_2$ (l) | → ½$B_2H_6$ (g) + 3/2$Cl_2SiEt_2$ (l) | −100 | −70 |
| $BCl_3$ (g) + 3/4 $SiH_4$ (g) | → ½$B_2H_6$ (g) + 3/4 $SiCl_4$ (l) | −120 | −80 |
| $BCl_3$ (g) + 3/2$MgH_2$ (s) | → ½$B_2H_6$ (g) + 3/2$MgCl_2$ (s) | −430 | −400 |
| $BCl_3$ (g) + 3/2$CaH_2$ (s) | → ½$B_2H_6$ (g) + 3/2$CaCl_2$ (s) | −510 | −480 |
| $BCl_3$ (g) + 3/2$TiH_2$ (s) | → ½$B_2H_6$ (g) + 3/2$TiCl_2$ (s) | −140 | −110 |
| $BCl_3$ (g) + ¾$SnH_4$ (l) | → ½$B_2H_6$ (g) + ¾$SnCl_4$ (l) | −80 | −40 |

TABLE VI

Hydrogenation of by-products (all calculations at 25° C.)

| Starting Materials | End Products(s) | $\Delta_R H$, kJ mol$^{-1}$ | $\Delta_R G$, kJ mol$^{-1}$ |
|---|---|---|---|
| 3SiCl$_4$ (l) + 3H$_2$ (g) | → 3HSiCl$_3$ (l) + 3HCl (g) | 220 | 180 |
| 3ClSiEt$_3$ (l) + 3H$_2$ (g) | → 3HSiEt$_3$ (l) + 3HCl (g) | 240 | 210 |
| 3/2SiCl$_4$ (l) + 3H$_2$ (gl) | → 3/2H$_2$SiCl$_2$ (l) + 3HCl (g) | 230 | 200 |
| 3/2Cl$_2$SiEt$_2$ (l) + 3H$_2$ (g) | → 3/2H$_2$SiEt$_2$ (l) + 3HCl (g) | 240 | 210 |
| ¾SiCl$_4$ (l) + 3H$_2$ (gl) | → ¾ SiH$_4$ (g) + 3HCl (g) | 260 | 220 |
| 3/2MgCl$_2$ (s) + 3H$_2$ (g) | → 3/2 MgH$_2$ (s) + 3HCl (g) | 570 | 540 |
| 3/2CaCl$_2$ (s) + 3H$_2$ (gl) | → 3/2CaH$_2$ (s) + 3HCl (g) | 650 | 620 |
| 3/2TiCl$_2$ (s) + 3H$_2$ (g) | → 3/2TiH$_2$ (s) + 3HCl (g) | 280 | 250 |
| ¾SnCl$_4$ (l) + 3H$_2$ (g) | → ¾ SnH$_4$ (l) + 3HCl (g) | 220 | 180 |

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A process for producing borazane from boron-nitrogen and boron-nitrogen-hydrogen containing BNH-waste products, comprising:
   a) reacting the BNH-waste products with a hydrogen halide, having the formula HX, to form a boron trihalide, having the formula BX$_3$, and an ammonium halide, having the formula NH$_4$X;
   b) reacting the boron trihalide with hydrogen to form diborane, having the formula B$_2$H$_6$, and hydrogen halide;
   c) converting the ammonium halide to ammonia, having the formula NH$_3$, and hydrogen halide; and
   d) reacting the diborane with ammonia to form borazane, having the formula BH$_3$NH$_3$;
   wherein H is hydrogen, wherein B is boron, wherein N is nitrogen, and wherein X is selected from the group consisting of F, Cl, Br, I, and combinations thereof.

2. The process according to claim 1, wherein the BNH-waste product of step (a) is converted to gaseous boron trihalide and solid ammonium halide by reacting the BNH-waste product with gaseous hydrogen halide.

3. The process according to claim 2, wherein the BNH-waste product is converted to ammonium halide and a partially hydrogenated boron compound having the formula BH$_y$X$_{3-y}$, wherein y is equal to 1 or 2.

4. The process according to claim 1, wherein the BNH waste product of step (a) is converted to boron trihalide and ammonium halide by reacting hydrogen halide with a slurry of BNH-waste product in an organic solvent selected from the group consisting of glyme, diglyme, triglyme, substituted 2,2,5,5-tetrahydrofuranes of formula (CR$_2$CH$_2$CH$_2$CR$_2$)O, wherein R is independently selected from hydrogen and straight or branched C$_1$ to C$_4$ alkyl group, ethers of the formula ROR, wherein R is independently selected from straight or branched C$_1$ to C$_4$ alkyl groups, unsubstituted or substituted phenyl groups, and combinations thereof.

5. The process according to claim 4, wherein the slurry of BNH-waste product is converted into ammonium halide and a complex of the boron trihalide with a solvent molecule.

6. The process according to claim 4, wherein the slurry of BNH-waste product is converted into ammonium halide and a partially hydrogenated boron compound having the formula BH$_y$X$_{3-y}$, wherein y is 1 or 2, or a dissolved complex of a boron compound having the formula BH$_y$X$_{3-y}$, wherein y is 1 or 2, with a solvent molecule.

7. The process according to claim 4, wherein the boron trihalide of step (b) is hydrogenated in solution in the presence of a base.

8. The process according to claim 7, wherein the base is selected from the group consisting of compounds having the formula NR$_3$, wherein R is independently selected from hydrogen, straight or branched C$_1$ to C$_6$ alkyl groups, unsubstituted or substituted phenyl groups, and combinations thereof.

9. The process according to claim 7, wherein the base is comprised of nitrogen-containing heterocyclic compounds.

10. The process according to claim 7, wherein the hydrogenation of boron trihalide is in the presence of a base and forms a dissolved BH$_3$-base complex, wherein the base is selected from the group consisting of heterocyclic compounds, compounds having the formula NR$_3$, wherein R is independently selected from hydrogen, straight or branched C$_1$ to C$_6$ alkyl groups, unsubstituted or substituted phenyl groups, and combinations thereof.

11. The process according to claim 7, wherein the hydrogenation of boron trihalide is in the presence of a base and forms a solid by-product base-hydrogen halide.

12. The process according to claim 7, wherein the hydrogenation of boron trihalide is performed in the presence of a homogeneous hydrogenation catalyst.

13. The process according to claim 7, wherein the solvent is a base selected from the group consisting of heterocyclic compounds, compounds having the formula NR$_3$, wherein R is independently selected from hydrogen, straight or branched C$_1$ to C$_6$ alkyl groups, unsubstituted or substituted phenyl groups, and combinations thereof.

14. The process according to claim 7, wherein the solvent is a complex having the formula BH$_3$NR$_3$.

15. The process according to claim 10, wherein the diborane is removed from a reaction mixture that contains the dissolved BH$_3$-base complex by reacting with fresh boron trichloride.

16. The process according to claim 11, wherein the solid by-product base-hydrogen halide is recycled to the base and hydrogen halide for use in step (b) and step (a), respectively.

17. The process according to claim 1, wherein the production of ammonia in step (c) is promoted by reacting of a slurry of ammonium halide with a base, wherein the base is selected from the group consisting of heterocyclic compounds, compounds having the formula NR$_3$, wherein R is independently selected from hydrogen, straight or branched C$_1$ to C$_6$ alkyl groups, unsubstituted or substituted phenyl groups, and combinations thereof.

18. The process according to claim 17, wherein the reaction of the ammonium halide with a base leads to the formation of a by-product base-hydrogen halide.

19. The process according to claim 18, wherein the by product base-hydrogen halide is recycled to the base and hydrogen halide for use in step (b) and step (a), respectively.

20. The process according to claim 1, wherein step (d) is performed by reacting frozen liquid ammonia and gaseous diborane.

21. The process according to claim 1, wherein step (d) is performed in an organic solvent.

22. The process according to claim 1, wherein step (d) is performed in an organic solvent selected from the group consisting of glyme, diglyme, triglyme, substituted 2,2,5,5-tetrahydrofuranes having the formula (CR$_2$CH$_2$CH$_2$CR$_2$)O, wherein R is independently selected from hydrogen and straight or branched C$_1$ to C$_4$ alkyl group, ethers of the formula ROR, wherein R is independently selected from straight or branched C$_1$ to C$_4$ alkyl groups, unsubstituted or substituted phenyl groups, and combinations thereof.

23. A process for producing borazane from boron-nitrogen and boron-nitrogen-hydrogen containing BNH waste products, comprising:
   a) reacting the BNH-waste products with a hydrogen halide, having the formula HX, to form a boron trihalide, having the formula $BX_3$, and ammonium halide, having the formula $NH_4X$;
   b) reacting the boron trihalide with a hydride-donating silicon compound, to form diborane $B_2H_6$, and a silicon-containing by-product;
   c) converting the ammonium halide to ammonia, having the formula $NH_3$, and hydrogen halide;
   d) reacting the diborane with ammonia to form borazane, having the formula $BH_3NH_3$; and
   e) reacting the by-product of step (b) with hydrogen to form hydrogen halide and a hydride-donating silicon compound;
   wherein H is hydrogen, wherein B is boron, wherein N is nitrogen, and wherein X is selected from the group consisting of F, Cl, Br, I, and combinations thereof.

24. The process according to claim 23, wherein the BNH-waste product of step (a) is converted to gaseous boron trihalide and solid ammonium halide by reacting the BNH-waste product with gaseous hydrogen halide.

25. The process according to claim 24, wherein the BNH-waste product is converted to ammonium halide and a partially hydrogenated boron compound having the formula $BH_yX_{3-y}$, wherein y is equal to 1 or 2.

26. The process according to claim 23, wherein the BNH waste product of step (a) is converted to boron trihalide and ammonium halide by reacting hydrogen halide with a slurry of BNH-waste product in an organic solvent selected from the group consisting of glyme, diglyme, triglyme, substituted 2,2,5,5-tetrahydrofuranes of formula $(OR_2OH_2OH_2OR_2)O$, wherein R is independently selected from hydrogen and straight or branched $C_1$ to $C_4$ alkyl group, ethers of the formula ROR, wherein R is independently selected from straight or branched $C_1$ to $C_4$ alkyl groups, unsubstituted or substituted phenyl groups, and combinations thereof.

27. The process according to claim 26, wherein the slurry of BNH-waste product is converted into ammonium halide and a complex of the boron trihalide with a solvent molecule.

28. The process according to claim 26, wherein the slurry of BNH-waste product is converted into ammonium halide and a partially hydrogenated boron compound having the formula $BH_yX_{3-y}$, wherein y is 1 or 2, or a dissolved complex of a boron compound having the formula $BH_yX_{3-y}$, wherein y is 1 or 2, with a solvent molecule.

29. The process according to claim 26, wherein the boron trihalide of step (b) is hydrogenated in solution in the presence of a base.

30. The process according to claim 23, wherein the boron trihalide of step (b) is reacted with a silicon compound, having the formula $SiH_yR_{4-y}$, to obtain diborane and a compound having the formula $SiX_yR_{4-y}$, wherein y is 1, 2, 3 or 4, and R is independently selected from the group consisting of the halides F, Cl, Br, I, and combinations thereof, straight or branched $C_1$ to $C_6$ alkyl groups, unsubstituted or substituted phenyl groups, straight or branched $C_1$ to $C_4$ alkoxy groups, and combinations thereof.

31. The process according to claim 30, wherein the silicon compound is selected from the group consisting of unsubstituted and substituted cyclic siloxanes.

32. The process according to claim 30, wherein the boron trihalide is reacted with a silicon compound in solution to obtain diborane.

33. The process according to claim 32, wherein the solvent is selected from the group consisting of glyme, diglyme, triglyme, substituted 2,2,5,5-tetrahydrofuranes of formula $(CR_2CH_2CH_2CR_2)O$, wherein R is independently selected from hydrogen and straight or branched $C_1$ to $C_4$ alkyl group, ethers of the formula ROR, wherein R is independently selected from straight or branched $C_1$ to $C_4$ alkyl groups, unsubstituted or substituted phenyl groups, and combinations thereof.

34. The process according to claim 32, wherein the boron trihalide is converted to a dissolved complex of borane with a solvent molecule.

35. The process according to claim 23, wherein the by-product of step (b) is recycled by reacting it with hydrogen to obtain the hydrogen halide and the hydride-donating silicon compound used in step (a) and step (b), respectively.

36. The process according to claim 23, wherein step (d) is performed by reacting frozen liquid ammonia and gaseous diborane.

37. The process according to claim 23, wherein step (d) is performed in an organic solvent.

38. The process according to claim 23, wherein step (d) is performed in an organic solvent selected from the group consisting of glyme, diglyme, triglyme, substituted 2,2,5,5-tetrahydrofuranes having the formula $(CR_2CH_2CH_2CR_2)O$, wherein R is independently selected from hydrogen and straight or branched $C_1$ to $C_4$ alkyl group, ethers of the formula ROR, wherein R is independently selected from straight or branched $C_1$ to $C_4$ alkyl groups, unsubstituted or substituted phenyl groups, and combinations thereof.

39. A process for producing borazane from boron-nitrogen and boron-nitrogen-hydrogen containing BNH waste products, comprising:
   a) reacting the BNH-waste products with a hydrogen halide, having the formula HX, to form a boron trihalide, having the formula $BX_3$, and ammonium halide, having the formula $NH_4X$;
   b) reacting the boron trihalide with a metal hydride to form diborane $B_2H_6$ and a metal-containing by-product;
   c) converting the ammonium halide to ammonia, having the formula $NH_3$, and hydrogen halide;
   d) reacting the diborane with ammonia to form borazane, having the formula $BH_3NH_3$; and
   e) reacting the by-product of step (b) with hydrogen to form hydrogen halide and a metal hydride;
   wherein H is hydrogen, wherein B is boron, wherein N is nitrogen, wherein M is a metal, and wherein X is selected from the group consisting of F, Cl, Br, I, and combinations thereof.

40. The process according to claim 39, wherein the BNH-waste products of step (a) are converted to gaseous boron trihalide and solid ammonium halide by reacting the BNH-waste products with gaseous hydrogen halide.

41. The process according to claim 40, wherein the BNH waste products are converted to ammonium halide and a partially hydrogenated boron compound having the formula $BH_yX_{3-y}$, wherein y is equal to 1 or 2.

42. The process according to claim 39, wherein the BNH-waste products of step (a) are converted to boron trihalide and ammonium halide by reacting hydrogen halide with a slurry of BNH-waste product in an organic solvent selected from the group consisting of glyme, diglyme, triglyme, substituted 2,2,5,5-tetrahydrofuranes of formula $(CR_2CH_2CH_2CR_2)O$, wherein R is independently selected from hydrogen and straight or branched $C_1$ to $C_4$ alkyl group, ethers of the formula ROR, wherein R is independently selected from straight or branched $C_1$ to $C_4$ alkyl groups, unsubstituted or substituted phenyl groups, and combinations thereof.

43. The process according to claim 42, wherein the slurry of BNH-waste products is converted into ammonium halide and a complex of the boron trihalide with a solvent molecule.

44. The process according to claim 42, wherein the slurry of BNH-waste product is converted into ammonium halide and a partially hydrogenated boron compound having the formula $BH_yX_{3-y}$, wherein y is 1 or 2, or a dissolved complex of a boron compound having the formula $BH_yX_{3-y}$, wherein y is 1 or 2, with a solvent molecule.

45. The process according to claim 39, wherein the metal hydride is selected from the group consisting of LiH, NaH, KH, $MgH_2$, $CaH_2$, $ZnH_2$, $TiH_2$, $AlH_3$, $GaH_3$, and combinations thereof.

46. The process according to claim 45, wherein the boron trihalide is reacted with a suspension of activated $MgH_2$.

47. The process according to claim 46, wherein the solvent is selected from the group consisting of glyme, diglyme, triglyme, substituted 2,2,5,5-tetrahydrofuranes having the formula $(CR_2CH_2CH_2CR_2)O$, wherein R is independently selected from hydrogen and straight or branched $C_1$ to $C_4$ alkyl group, ethers of the formula ROR, wherein R is independently selected from straight or branched $C_1$ to $C_4$ alkyl groups, unsubstituted or substituted phenyl groups, and combinations thereof.

48. The process according to claim 47, wherein the boron trihalide is converted to a dissolved complex of borane with a solvent molecule.

49. The process according to claim 39, wherein the by-product of step (b) is recycled by a three step process, wherein the first step is given by an electrochemical step of producing the metal and the halide compound from the by-product, the second step is given by the reaction of the halide compound $X_2$ with hydrogen to form the hydrogen halide used in step (a), and the third step is given by the reaction of the metal with hydrogen to form the metal hydride used in step (b).

50. The process according to claim 39, wherein step (d) is performed by reacting frozen liquid ammonia and gaseous diborane.

51. The process according to claim 39, wherein step (d) is performed in an organic solvent.

52. The process according to claim 39, wherein step (d) is performed in an organic solvent selected from the group consisting of glyme, diglyme, triglyme, substituted 2,2,5,5-tetrahydrofuranes having the formula $(CR_2CH_2CH_2CR_2)O$, wherein R is independently selected from hydrogen and straight or branched $C_1$ to $C_4$ alkyl group, ethers of the formula ROR, wherein R is independently selected from straight or branched $C_1$ to $C_4$ alkyl groups, unsubstituted or substituted phenyl groups, and combinations thereof.

* * * * *